(12) United States Patent
Takahara et al.

(10) Patent No.: US 10,220,837 B2
(45) Date of Patent: Mar. 5, 2019

(54) VEHICLE BEHAVIOR CONTROL DEVICE

(71) Applicant: MAZDA MOTOR CORPORATION, Hiroshima (JP)

(72) Inventors: Yasunori Takahara, Hiroshima (JP); Tomoji Izumi, Hiroshima (JP); Daisuke Umetsu, Hiroshima (JP); Osamu Sunahara, Hiroshima (JP); Masaki Chiba, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/634,823

(22) Filed: Jun. 27, 2017

(65) Prior Publication Data

US 2018/0001888 A1 Jan. 4, 2018

(30) Foreign Application Priority Data

Jun. 30, 2016 (JP) ................................. 2016-129903

(51) Int. Cl.
*B60W 30/045* (2012.01)
*B60W 10/04* (2006.01)
(Continued)

(52) U.S. Cl.
CPC .......... *B60W 30/045* (2013.01); *B60W 10/04* (2013.01); *B60W 10/20* (2013.01);
(Continued)

(58) Field of Classification Search
CPC ........ B62D 6/04; B62D 15/02; B62D 15/021; B62D 15/0215; B62D 15/022;
(Continued)

(56) References Cited

U.S. PATENT DOCUMENTS 7,913,803 B2 * 3/2011 Hidaka ................ B62D 15/025
180/443
8,433,493 B2    4/2013 Takahashi et al.
(Continued)

FOREIGN PATENT DOCUMENTS

DE  10 2014 015 721 A1   4/2015
EP      2 712 780 A1      4/2014
(Continued)

OTHER PUBLICATIONS

An Office Action issued by the German Patent Office dated Sep. 3, 2018, which corresponds to German Patent Application No. 10 2017 114 346.7 and is related to U.S. Appl. No. 15/634,823.

*Primary Examiner* — Thomas G Black
*Assistant Examiner* — Sara J Lewandroski
(74) *Attorney, Agent, or Firm* — Studebaker & Brackett PC

(57) ABSTRACT

A vehicle behavior control device for controlling a vehicle equipped with a steering apparatus comprises: a PCM operable to acquire a steering speed in the steering apparatus, and, when the steering speed becomes equal to or greater than a given threshold ($T_{S1}$) which is greater than 0, to reduce a driving force for the vehicle according to the steering speed, wherein the steering apparatus comprises a steering shaft coupled to the steering wheel and rotatable together with the steering wheel, wherein the steering shaft has a torsion bar whose torsional rigidity about a rotational axis of the steering shaft is less than a remaining portion of the steering shaft. The steering speed acquisition section is configured to acquire the steering speed of the steering apparatus at a position on the side of the front road wheels with respect to the low rigidity portion.

5 Claims, 9 Drawing Sheets

(51) Int. Cl.
*B60W 10/20* (2006.01)
*B62D 5/04* (2006.01)
*B60W 30/02* (2012.01)

(52) U.S. Cl.
CPC ......... *B60W 30/02* (2013.01); *B60W 2422/00* (2013.01); *B60W 2422/50* (2013.01); *B60W 2510/202* (2013.01); *B60W 2510/205* (2013.01); *B60W 2710/08* (2013.01); *B60W 2720/106* (2013.01); *B62D 5/04* (2013.01)

(58) Field of Classification Search
CPC .............. B62D 15/0225; B62D 15/023; B62D 15/0235; B62D 15/024; B62D 15/025; B62D 6/00; B62D 6/002; B62D 6/008; B62D 6/06; B62D 6/08; B62D 6/10; B60W 30/045; B60W 30/02; B60W 30/025; B60W 2422/50; B60W 2510/20; B60W 2510/202; B60W 2510/205; B60W 2510/207; B60W 2540/18
See application file for complete search history.

(56) References Cited

U.S. PATENT DOCUMENTS

| | | | |
|---|---|---|---|
| 8,538,653 | B2 | 9/2013 | Miyajima et al. |
| 8,676,464 | B2 | 3/2014 | Shimura et al. |
| 8,880,293 | B2 | 11/2014 | Hirao et al. |
| 8,977,464 | B1 | 3/2015 | Takahashi et al. |
| 8,989,981 | B2 | 3/2015 | Yamakado et al. |
| 9,043,116 | B2 | 5/2015 | Takahashi et al. |
| 9,086,427 | B2 | 7/2015 | Maeda et al. |
| 9,139,107 | B2 | 9/2015 | Kageyama et al. |
| 9,211,875 | B2 | 12/2015 | Harada |
| 9,296,374 | B2 | 3/2016 | Yamakado et al. |
| 9,327,765 | B2 * | 5/2016 | Takeda ................... B62D 6/003 |
| 9,352,747 | B2 | 5/2016 | Nagatsuka et al. |
| 2002/0035871 | A1 * | 3/2002 | Pallot ................... B60T 8/1755 73/489 |
| 2004/0090199 | A1 * | 5/2004 | Kanda ................... B62D 6/008 318/432 |
| 2004/0148080 | A1 * | 7/2004 | Ekmark ................. B62D 5/046 701/41 |
| 2005/0222727 | A1 * | 10/2005 | Hille ..................... B60W 30/04 701/38 |
| 2006/0069481 | A1 * | 3/2006 | Kubota ................ B62D 5/0463 701/41 |
| 2007/0219691 | A1 * | 9/2007 | Fukuba ................. B62D 6/008 701/42 |
| 2011/0060505 | A1 * | 3/2011 | Suzuki ..................... B60T 7/12 701/42 |
| 2011/0153162 | A1 * | 6/2011 | Kezobo ................ B62D 5/0463 701/42 |
| 2011/0202250 | A1 | 8/2011 | Miyajima et al. |
| 2012/0053791 | A1 | 3/2012 | Harada |
| 2012/0277965 | A1 | 11/2012 | Takahashi et al. |
| 2012/0316744 | A1 | 12/2012 | Shimura et al. |
| 2013/0041541 | A1 | 2/2013 | Kageyama et al. |
| 2013/0079988 | A1 | 3/2013 | Hirao et al. |
| 2013/0345901 | A1 | 12/2013 | Maeda et al. |
| 2014/0222309 | A1 | 8/2014 | Yamakado et al. |
| 2014/0365077 | A1 * | 12/2014 | Kariatsumari ....... B62D 5/0472 701/41 |
| 2015/0032335 | A1 * | 1/2015 | Kodama ............... B60W 10/20 701/42 |
| 2015/0094924 | A1 | 4/2015 | Takahashi et al. |
| 2015/0094927 | A1 | 4/2015 | Takahashi et al. |
| 2015/0120121 | A1 * | 4/2015 | Nobumoto ............. B60L 11/18 701/22 |
| 2015/0144418 | A1 * | 5/2015 | Ohno ................... B62D 5/0466 180/446 |
| 2015/0166025 | A1 | 6/2015 | Nagatsuka et al. |
| 2015/0225014 | A1 * | 8/2015 | Takeda .................. B62D 6/008 701/41 |
| 2015/0232124 | A1 * | 8/2015 | Takeda ................ B62D 15/025 701/42 |
| 2015/0239442 | A1 | 8/2015 | Yamakado et al. |
| 2015/0298696 | A1 | 10/2015 | Nagatsuka et al. |
| 2015/0321669 | A1 | 11/2015 | Inou et al. |
| 2015/0353127 | A1 * | 12/2015 | Takeda .................. B62D 6/008 701/41 |
| 2015/0367852 | A1 | 12/2015 | Nagatsuka et al. |
| 2016/0059852 | A1 | 3/2016 | Yamakado et al. |
| 2016/0244038 | A1 | 8/2016 | Yamakado et al. |
| 2016/0347357 | A1 * | 12/2016 | Kitazume ............ B62D 5/0466 |
| 2017/0297611 | A1 * | 10/2017 | Raad ........................ B62D 6/04 |
| 2017/0305416 | A1 * | 10/2017 | Yamakado .......... B60W 40/109 |
| 2017/0350975 | A1 * | 12/2017 | Asanuma ................. G01S 13/60 |
| 2018/0158262 | A1 * | 6/2018 | Hizaki ................. G07C 5/0825 |

FOREIGN PATENT DOCUMENTS

| | | |
|---|---|---|
| EP | 2 712 782 A1 | 4/2014 |
| JP | 2002-248966 A | 9/2002 |
| JP | 2008-110620 A | 5/2008 |
| JP | 5193885 B2 | 5/2013 |
| JP | 2014-166014 A | 9/2014 |
| JP | 2015-085820 A | 5/2015 |
| JP | 2015-085823 A | 5/2015 |
| JP | 2015-089251 A | 5/2015 |
| JP | 2015-089252 A | 5/2015 |
| JP | 2015-127194 A | 7/2015 |
| JP | 2015-182752 A | 10/2015 |
| JP | 2016-039750 A | 3/2016 |
| JP | 2016-039751 A | 3/2016 |
| JP | 2016-068649 A | 5/2016 |
| JP | 2016-091198 A | 5/2016 |
| WO | 2012/042935 A1 | 4/2012 |
| WO | 2014/054432 A1 | 4/2014 |
| WO | 2014/119171 A1 | 8/2014 |
| WO | 2016/020718 A1 | 2/2016 |

* cited by examiner

VEHICLE BEHAVIOR CONTROL DEVICE

TECHNICAL FIELD

The present invention relates to a vehicle behavior control device, and more particularly to a vehicle behavior control device for controlling a behavior of a vehicle having steerable front road wheels.

BACKGROUND ART

Heretofore, there has been known a control device capable of, in a situation where a behavior of a vehicle becomes unstable due to road wheel slip or the like, controlling the vehicle behavior to enable a safe traveling (e.g., an antiskid brake device). Specifically, there has been known a control device operable to detect the occurrence of vehicle understeer or oversteer behavior during vehicle cornering or the like, and apply an appropriate degree of deceleration to one or more road wheels so as to suppress such a behavior.

There has also been known a vehicle motion control device operable to automatically perform acceleration or deceleration associated with a steering wheel operation which is started from a usual driving region, to thereby reduce skid in a marginal driving region, differently from the above control for improving safety in a traveling condition causing the vehicle behavior to become unstable (see, for example, the following Patent Document 1).

CITATION LIST

Patent Document

Patent Document 1: JP 5193885 B

SUMMARY OF INVENTION

Technical Problem

The vehicle motion control device described in the Patent Document 1 is configured to detect a steering angle along with a steering wheel operation by a driver, as a parameter best reflecting an intention of the driver, and perform the acceleration/deceleration control using this steering angle. With a view to reflecting the driver's intention, the steering angle is detected by a driver-induced steering angle sensor provided at a position very close to the steering wheel.

That is, although the conventional vehicle motion control device is configured to detect the steering angle and perform the acceleration/deceleration control, with a focus on reflecting an intention of a driver to a behavior of a vehicle, there remains a need for improvement in terms of stability of a vehicle attitude and riding comfort.

The present invention has been made to solve the above conventional problem, and an object thereof is to provide a vehicle behavior control device capable of controlling a behavior of a vehicle in such a manner as to not only reflect an intention of a driver to the vehicle behavior but also further improve stability of a vehicle attitude and riding comfort.

Solution to Technical Problem

In order to achieve the above object, the present invention provides a vehicle behavior control device for controlling a behavior of a vehicle equipped with a steering apparatus configured to transmit a rotation of a steering wheel to front road wheels to thereby steer the front road wheels. The vehicle behavior control device comprises: a steering speed acquisition section operable to acquire a steering speed in the steering apparatus; and a driving force reduction section operable, when the steering speed becomes equal to or greater than a given threshold which is greater than 0, to reduce a driving force for the vehicle according to the steering speed, wherein the steering apparatus comprises a steering shaft coupled to the steering wheel and rotatable together with the steering wheel, wherein the steering shaft has a low rigidity portion whose torsional rigidity about a rotational axis of the steering shaft is less than a remaining portion of the steering shaft. The steering speed acquisition section is configured to acquire the steering speed of the steering apparatus at a position on the side of the front road wheels with respect to the low rigidity portion.

In the vehicle behavior control device of the present invention configured as above, the steering speed acquisition section is configured to acquire the steering speed at a position on the side of the front road wheels with respect to the low rigidity portion whose torsional rigidity about the rotational axis is less than the remaining portion of the steering shaft, and reduce the vehicle driving force according to the acquired steering speed, so that, in a situation where at least one of the front road wheels is forcibly steered by a disturbance force, e.g., influence of unevenness of a road surface or crosswind, it is possible to acquire the steering speed according to a change in steering angle of the front road wheel, without delay, and to enable the driving force reduction section to perform the control of reducing the vehicle driving force according to the acquired steering speed to increase a vertical load on the front road wheel. This makes it possible to generate a reaction force torque acting to return the steering angle of the front road wheel to an angle enabling straight-ahead traveling, before the disturbance force is transmitted to a driver via the steering wheel, to thereby improve vehicle straight-ahead traveling performance.

Further, in a situation where a driver who feels, via the steering wheel, the steering movement of the front road wheel caused by the disturbance force attempts to perform a corrective steering operation so as to hold a current course of the vehicle, the driving force reduction section is operable, before the driver starts the corrective steering operation, to perform the driving force reduction control to increase a vertical load on the front road wheel, so that it is possible to increase a lateral force generated when the driver actually starts the corrective steering operation, and thus enhance responsivity of vehicle behavior with respect to the corrective steering operation. This makes it possible to suppress an unnecessary corrective steering operation to improve stability of the vehicle attitude and riding comfort.

Preferably, in the vehicle behavior control device of the present invention, the steering apparatus further comprises: a torque sensor for detecting a steering torque acting on the steering shaft according to operation of the steering wheel; and an electric motor for applying an assist torque to the steering apparatus according to the steering torque detected by the torque sensor, at the position on the side of the front road wheels with respect to the low rigidity portion, wherein the torque sensor is configured to detect the steering torque based on an amount of torsion of the low rigidity portion.

In the vehicle behavior control device having this feature, in the case where the steering apparatus is constructed as an electric power steering apparatus comprising the torque sensor and the motor, the steering speed acquisition section is operable to acquire the steering speed at a position on the side of the front road wheels with respect to the low rigidity portion in which the torque sensor is installed, and reduce the vehicle driving force according to the acquired steering speed, so that, in a situation where at least one of the front road wheels in the vehicle equipped with the steering apparatus constructed as the electric power steering apparatus is forcibly steered by a disturbance force, e.g., influence of unevenness of a road surface or crosswind, it is possible to acquire the steering speed according to a change in steering angle of the front road wheel, without delay, and to enable the driving force reduction section to perform the control of reducing the vehicle driving force according to the acquired steering speed. This makes it possible to quickly generate a reaction force torque acting to return the steering angle of the front road wheel to an angle enabling straight-ahead traveling, and suppress an unnecessary corrective steering operation to improve stability of the vehicle attitude and riding comfort.

Preferably, in the vehicle behavior control device of the present invention, the steering apparatus further comprises: a torque sensor for detecting a steering torque acting on the steering shaft according to operation of the steering wheel; and an electric motor for applying an assist torque to the steering apparatus according to the steering torque detected by the torque sensor, at the position on the side of the front road wheels with respect to the low rigidity portion, wherein the steering speed acquisition section is configured to acquire the steering speed based on a rotational angle of the motor.

In the vehicle behavior control device having this feature, the steering speed acquisition section is configured to acquire the steering speed based on a rotational angle of the motor disposed on the side of the front road wheels with respect to the low rigidity portion, so that it is possible to achieve reduction in component cost and simplification in production process, as compared to case where a sensor for detecting the steering angle is provided separately.

Preferably, in the vehicle behavior control device of the present invention, the driving force reduction section is operable to reduce the vehicle driving force according to the steering speed, such that a deceleration of the vehicle caused by the reduction in the vehicle driving force becomes 0.05 G or less.

In the vehicle behavior control device having this feature, the driving force reduction section is operable to reduce the vehicle driving force according to the steering speed, such that a deceleration of the vehicle caused by the reduction in the vehicle driving force becomes 0.05 G or less, so that, in the situation where at least one of the front road wheels is forcibly steered by a disturbance force, e.g., influence of unevenness of a road surface or crosswind, it is possible to perform the control of reducing the vehicle driving force based on the steering speed according to a change in steering angle of the front road wheel, in such a manner as to generate a deceleration to an extent that a driver does not feel intervention of the control. This makes it possible to improve stability of a vehicle attitude and riding comfort without causing strong feeling of intervention of the control.

Effect of Invention

The vehicle behavior control device of the present invention can control a behavior of a vehicle in such a manner as to not only reflect an intention of a driver to the vehicle behavior but also further improve stability of the vehicle attitude and riding comfort.

DESCRIPTION OF EMBODIMENTS

With reference to the accompanying drawings, a vehicle behavior control device according to one embodiment of the present invention will now be described.

Figure 1:
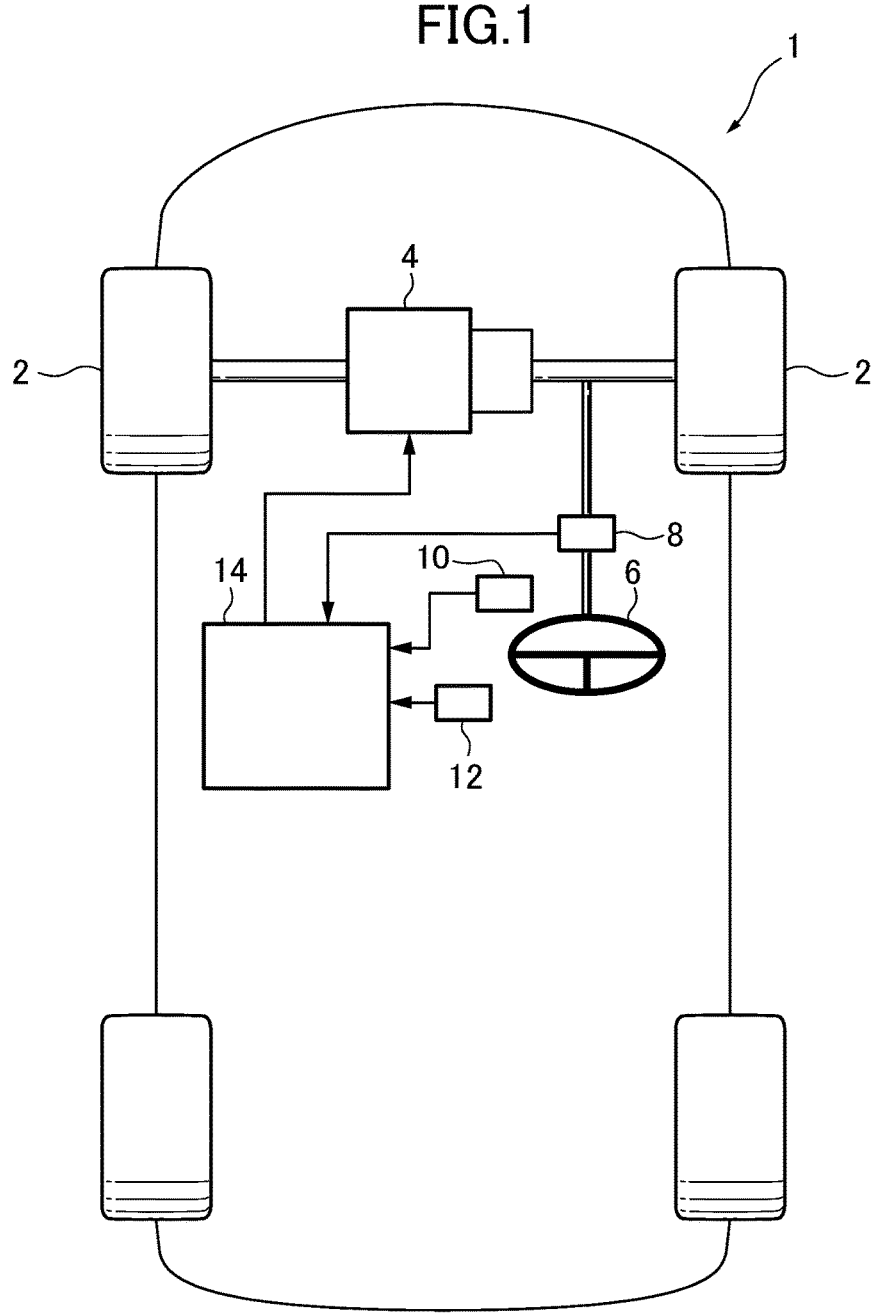
FIG. 1 is a block diagram depicting an overall configuration of a vehicle equipped with a vehicle behavior control device according to one embodiment of the present invention.

First of all, with reference to FIG. 1, a vehicle equipped with a vehicle behavior control device according to one embodiment of the present invention will be described. FIG. 1 is a block diagram depicting an overall configuration of the vehicle equipped with the vehicle behavior control device according to this embodiment.

In FIG. 1, the reference sign 1 denotes the vehicle equipped with the vehicle behavior control device according to this embodiment. A vehicle body of the vehicle 1 has a front portion on which an engine 4 for driving drive road wheels (in the vehicle depicted in FIG. 1, right and left front road wheels 2) is mounted. The engine 4 is an internal combustion engine such as a gasoline engine or a diesel engine.

The vehicle 1 is equipped with a steering apparatus 8 configured to a rotation of a steering wheel 6 to the front road wheels 2. The steering apparatus 8 is constructed as an electric power assisted steering (EPAS) apparatus configured to assist steering of the steering wheel 6 by an aftermentioned electric motor. The steering apparatus 8 is operable to output a steering angle in the steering apparatus 8 to a power-train control module (PCM) 14.

The vehicle 1 has an accelerator position sensor 10 for detecting an amount of depression of an accelerator pedal (accelerator position), and a vehicle speed sensor 12 for detecting a vehicle speed. Each of the above sensors is operable to output a detection value to the PCM 14.

Figure 2:
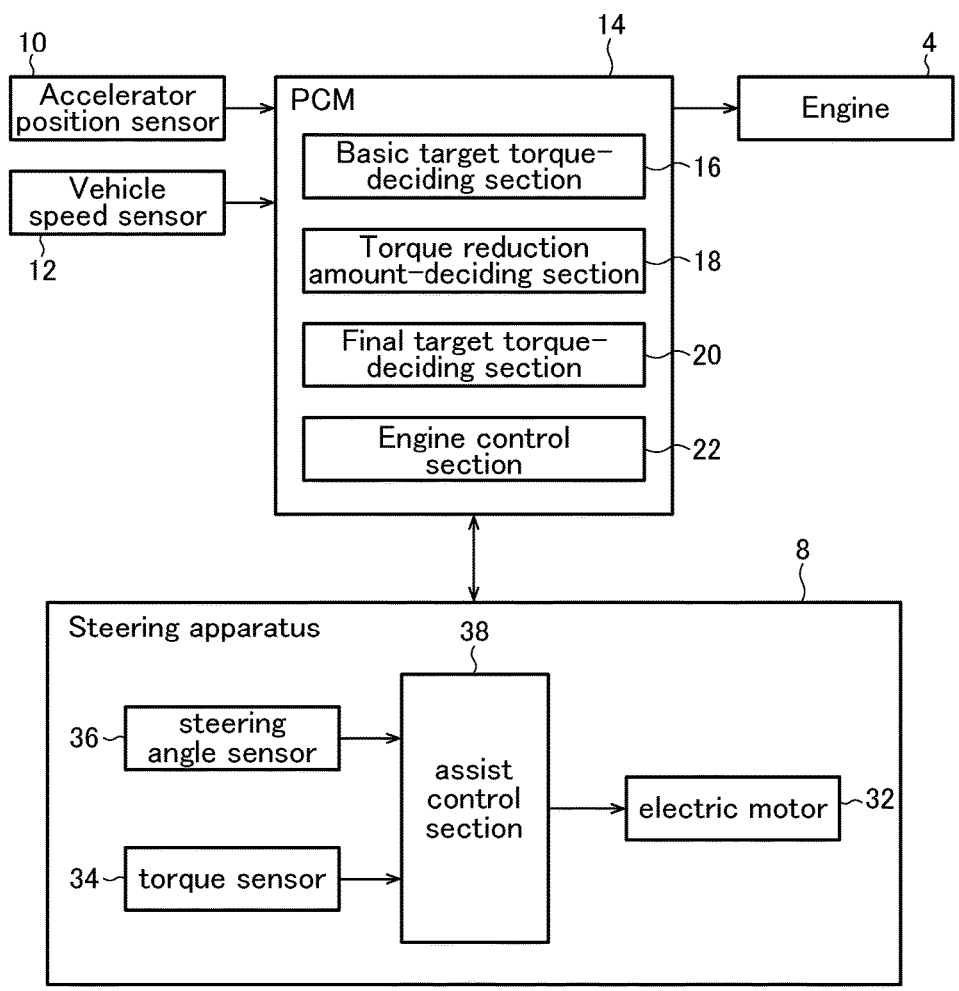
FIG. 2 is a block diagram depicting an electrical configuration of the vehicle behavior control device according to this embodiment.

Next, with reference to FIG. 2, an electrical configuration of the vehicle behavior control device according to this embodiment will be described. FIG. 2 is a block diagram depicting the electrical configuration of the vehicle behavior control device according to this embodiment.

The PCM 14 in this embodiment is configured to, based on a signal input from the steering apparatus 8, detection signals from the sensors 10, 12, and other detection signals output from various sensors for detecting an operating state of the engine 4, generate and output control signals to perform controls with respect to various components (e.g., a throttle valve, a turbocharger, a variable valve mechanism, an ignition unit, a fuel injection valve, and an EGR unit) of the engine 4.

The PCM 14 comprises: a basic target torque-deciding section 16 for deciding a basic target torque based on a driving state of the vehicle 1 including an accelerator pedal operation; a torque reduction amount-deciding section 18 for deciding a torque reduction amount for adding a deceleration to the vehicle 1 based on a steering speed in the steering apparatus 8; a final target torque-deciding section 20 for deciding a final target torque based on the basic target torque and the torque reduction amount; and an engine control section 22 for controlling the engine 4 to cause the engine 4 to output the final target torque.

These components of the PCM 14 are functionally realized by a computer which comprises: a CPU; various programs (including a basic control program such as an OS, and an application program capable of being activated on the OS to realize a specific function) to be interpreted and executed by the CPU; and an internal memory such as ROM or RAM storing therein the programs and a variety of data.

The PCM 14 is equivalent to a part of the vehicle behavior control device of the present invention, and functions as a steering speed acquisition section and a driving force reduction section, although details thereof will be described later.

Figure 3:
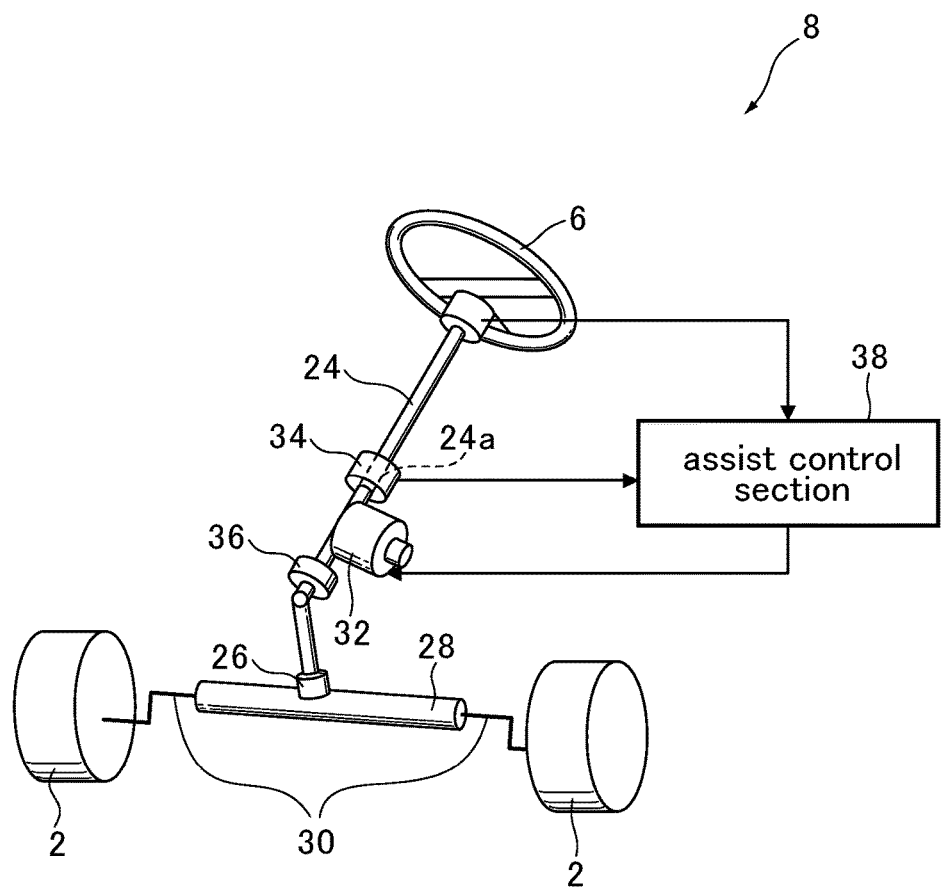
FIG. 3 is a schematic perspective view depicting a steering apparatus for use with the vehicle behavior control device according to this embodiment.

Next, with reference to FIGS. 2 and 3, the steering apparatus 8 according to this embodiment will be described. FIG. 3 is a schematic perspective view depicting the steering apparatus 8 according to this embodiment.

As depicted in FIG. 3, in the steering apparatus 8, the steering wheel 6 is coupled to an upper end of a steering shaft 24, such that a steering force for operating the steering wheel 6 is transmitted to the steering shaft 24. Right and left tie rods 30 are coupled to a lower end of the steering shaft 24 via a pinion gear and a rack shaft, and right and left front road wheels 2 (steerable road wheels) are attached, respectively, to outer ends of the right and left tie rods 30.

An electric motor 32 is coupled to the steering shaft 24 through a speed reduction mechanism. This motor 32 is provided as a means to apply an assist torque to the steering shaft 24.

A portion of the steering shaft 24 between the steering wheel 6 and the motor 32 is composed of a torsion bar (low rigidity portion) 24a whose torsional rigidity about a rotational axis of the steering shaft 24 is less than the remaining portion of the steering shaft 24.

In the vicinity of the torsion bar 24a, a torque sensor 34 is installed which is operable to detect a steering torque acting on the steering shaft 24 according to operation of the steering wheel 6. The torque sensor 34 is configured to detect the steering torque based on an amount of torsion of the torsion bar 24a.

At a position on the side of the front road wheels with respect to the torsion bar 24a, in the steering apparatus 8, a steering angle sensor 36 is installed which is operable to detect, as the steering angle, a rotational angle of the steering shaft 24.

Signals output from the torque sensor 34 and the steering angle sensor 36 are input to an assist control section 38. The assist control section 38 is operable, based on signals input thereto from the torque sensor 34 and the steering angle sensor 36, to control the motor 32. Further, the assist control section 38 is operable to output a detection value of the steering angle sensor 36, and acquire information about the vehicle speed and others.

Next, with reference to FIGS. 4 to 6, an engine control processing routine to be executed by the vehicle behavior control device according to this embodiment will be described.

Figure 4:
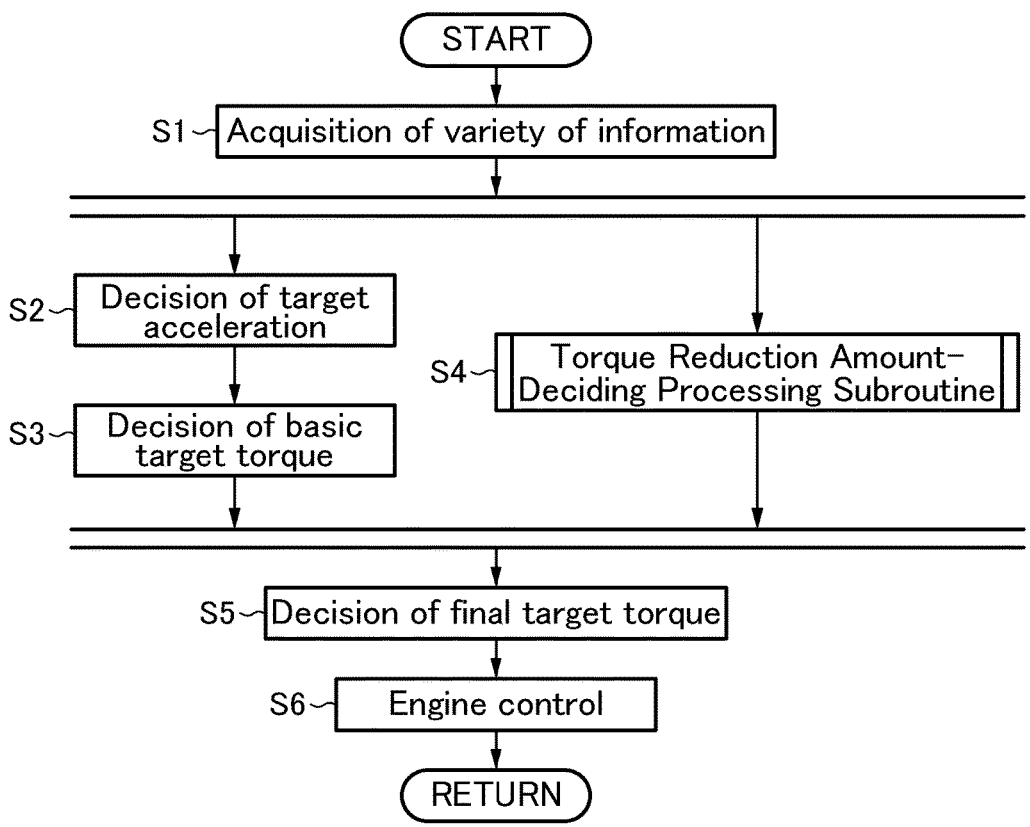
FIG. 4 is a flowchart depicting an engine control processing routine to be executed by the vehicle behavior control device according to this embodiment, so as to control an engine.

FIG. 4 is a flowchart depicting an engine control processing routine to be executed by the vehicle behavior control device according to this embodiment, so as to control the engine 4. FIG. 5 is a flowchart depicting a torque reduction amount-deciding processing subroutine to be executed by the vehicle behavior control device according to this embodiment, so as to decide the torque reduction amount, and FIG. 6 is a map depicting a relationship between steering speed, and target additional deceleration to be decided by the vehicle behavior control device according to this embodiment.

The engine control processing in FIG. 4 is activated when an ignition switch of the vehicle 1 is turned on to apply power to the vehicle behavior control device, and repeatedly executed with a given cycle period.

As depicted in FIG. 4, upon start of the engine control processing routine, in step S1, the PCM 14 operates to acquire a variety of information about a driving state of the vehicle 1. Specifically, the PCM 14 operates to acquire, as the information about the driving state, detection signals output from the aforementioned various sensors, including the steering angle detected by the steering angle sensor 36, the accelerator position detected by the accelerator position sensor 10, the vehicle speed detected by the vehicle speed sensor 12, and a speed stage currently set in an automatic transmission of the vehicle 1.

Subsequently, in step S2, the basic target torque-deciding section 16 of the PCM 14 operates to set a target acceleration based on the driving state of the vehicle 1 including an accelerator pedal operation state, acquired in the step S1. Specifically, the basic target torque-deciding section 16 operates to select, from among a plurality of acceleration characteristic maps each defining a relationship between acceleration and accelerator position, with respect to various vehicle speeds and various speed stages (the maps are preliminarily created and stored in a memory or the like), one acceleration characteristic map corresponding to a current vehicle speed and a current speed stage, and decide, as a target acceleration, an acceleration corresponding to a current accelerator position, with reference to the selected acceleration characteristic map.

Subsequently, in step S3, the basic target torque-deciding section 16 operates to decide a basic target torque of the engine 4 for realizing the target acceleration decided in the step S2. In this processing, the basic target torque-deciding section 16 operates to decide the basic target torque within a torque range outputtable by the engine 4, based on current vehicle speed, speed stage, road grade, road surface mu (μ), etc.

In parallel with the processings in the steps S2 and S3, in step S4, the torque reduction amount-deciding section 18 operates to execute a torque reduction amount-deciding processing subroutine for deciding a torque reduction amount for adding a deceleration to the vehicle 1 based on the steering wheel operation state. This torque reduction amount-deciding processing subroutine will be described with reference to FIG. 5.

Figure 5:
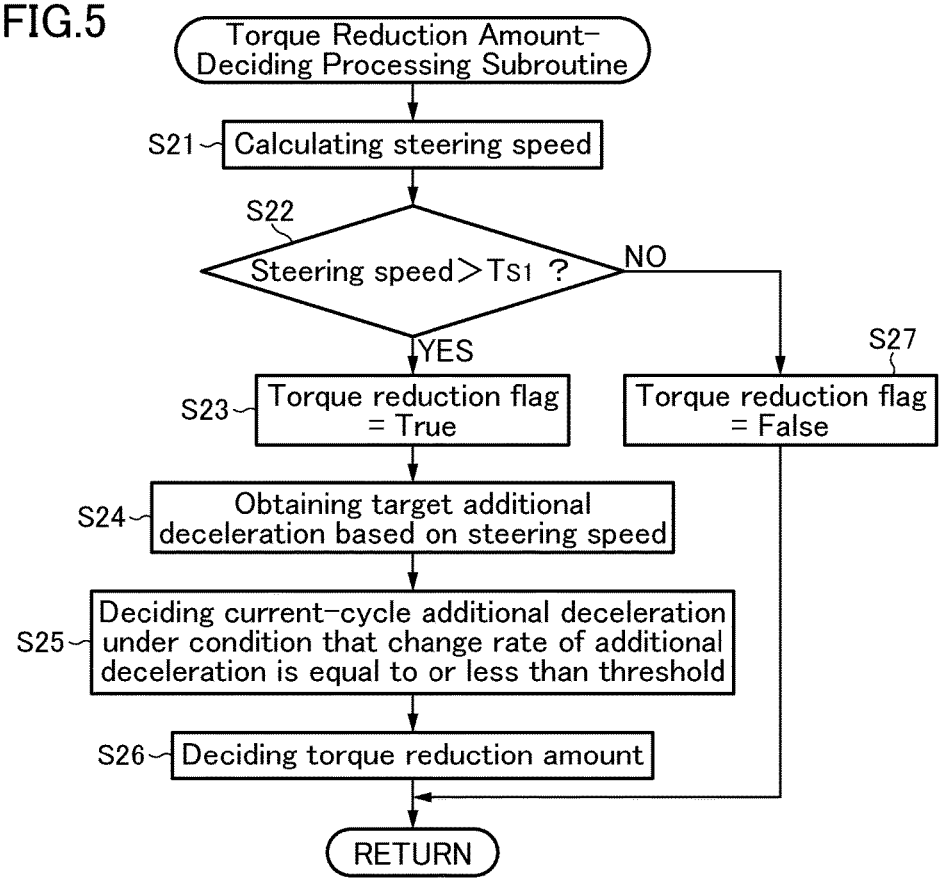
FIG. 5 is a flowchart depicting a torque reduction amount-deciding processing subroutine to be executed by the vehicle behavior control device according to this embodiment, so as to decide a torque reduction amount.

As depicted in FIG. 5, upon start of the torque reduction amount-deciding processing subroutine, in step S21, the torque reduction amount-deciding section 18 operates to calculate a steering speed based on the steering angle acquired in the step S1.

Subsequently, in step S22, the torque reduction amount-deciding section 18 operates to determine whether or not the steering speed is greater than a first threshold $T_{S1}$.

As a result, when the steering speed is greater than the first threshold $T_{S1}$, the subroutine proceeds to step S23. In the step S23, the torque reduction amount-deciding section 18 operates to set a torque reduction flag indicative of whether or not a condition for allowing reduction of an output torque of the engine 4 so as to add a deceleration to the vehicle 1 is satisfied, to True (true value) indicative of a state in which the condition for allowing the torque reduction is satisfied.

Subsequently, in step S24, the torque reduction amount-deciding section 18 operates to obtain a target additional deceleration based on the steering speed. This target additional deceleration is a deceleration to be added to the vehicle 1 according to the steering wheel operation, so as to accurately realize a vehicle behavior which is intended by a driver.

Figure 6:
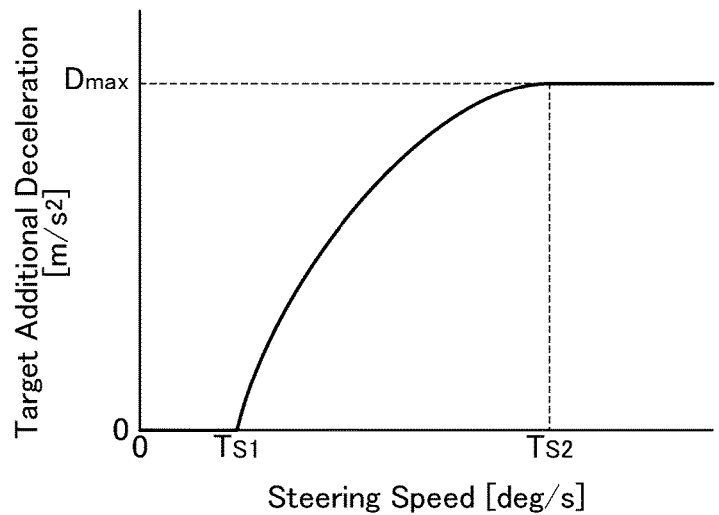
FIG. 6 is a map depicting a relationship between steering speed, and target additional deceleration to be decided by the vehicle behavior control device according to this embodiment.

Specifically, the torque reduction amount-deciding section 18 operates to obtain a value of the target additional deceleration corresponding to the steering speed calculated in the step S21, based on a relationship between target additional deceleration and steering speed, shown by the map in FIG. 6.

In FIG. 6, the horizontal axis represents the steering speed, and the vertical axis represents the target additional deceleration. As depicted in FIG. 6, when the steering speed is equal to or less than the first threshold $T_{S1}$, a corresponding value of the target additional deceleration is 0. That is, when the steering speed is equal to or less than the first threshold $T_{S1}$, the control for adding a deceleration to the vehicle 1 (specifically, for reducing the output torque of the engine 4) according to the steering wheel operation state is stopped.

On the other hand, when the steering speed is greater than the first threshold $T_{S1}$, a value of the target additional deceleration corresponding to this steering speed comes closer to a given upper limit value $D_{max}$ as the steering speed becomes larger. That is, as the steering speed becomes larger, the target additional deceleration becomes larger, and a rate of increase of the target additional deceleration becomes smaller. This upper limit value $D_{max}$ is set to a deceleration (e.g., 0.5 m/s² ≈ 0.05 G) to an extent that a driver does not feel intervention of the control even when the deceleration is added to the vehicle 1 according to the steering wheel operation.

Further, when the steering speed is greater than a second threshold $T_{S2}$ greater than the first threshold $T_{S1}$, the target additional deceleration is maintained at the upper limit value $D_{max}$.

Subsequently, in step S25, the torque reduction amount-deciding section 18 operates to decide an additional deceleration in the current processing cycle (current-cycle additional deceleration), under a condition that a change rate of the additional deceleration is equal to or less than a threshold $R_{max}$ (e.g., 0.5 m/s³).

Specifically, the torque reduction amount-deciding section 18 operates to, when a change rate from an additional deceleration decided in the last processing cycle (last-cycle additional deceleration) to the target additional deceleration decided in the step S24 in the current processing cycle is equal to or less than the threshold $R_{max}$, decide the target additional deceleration decided in the step S24, as the current-cycle additional deceleration.

On the other hand, the torque reduction amount-deciding section 18 operates to, when the change rate from the last-cycle additional deceleration to the target additional deceleration decided in the step S24 in the current processing cycle is greater than the threshold $R_{max}$, decide, as the current-cycle additional deceleration, a value obtained by increasing the last-cycle additional deceleration at the change rate $R_{max}$ for the given cycle period.

Subsequently, in step S26, the torque reduction amount-deciding section 18 operates to decide the torque reduction amount based on the current-cycle additional deceleration decided in the step S25. Specifically, the torque reduction amount-deciding section 18 operates to decide a value of the torque reduction amount necessary to realize the current-cycle additional deceleration, based on current vehicle speed, speed stage, road grade, etc., decided in the step S1.

On the other hand, in the step S22, when the steering speed is not greater than the first threshold $T_{S1}$ (equal to or greater than the first threshold $T_{S1}$), the subroutine proceeds to step S27. In the step S27, the torque reduction amount-deciding section 18 operates to set the torque reduction flag indicative of whether or not the condition for allowing reduction of the output torque of the engine 4 so as to add a deceleration to the vehicle 1 is satisfied, to False (false value) indicative of a state in which the condition for allowing the torque reduction is not satisfied.

After completion of the step S26 or S27, the torque reduction amount-deciding section 18 operates to terminate the torque reduction amount-deciding processing subroutine, and return to the main routine.

Returning to FIG. 4, after completion of the processings in the steps S2 and S3 and the torque reduction amount-deciding processing subroutine in the step S4, in step S5, the final target torque-deciding section 20 operates to subtract the torque reduction amount decided by the torque reduction amount-deciding processing subroutine in the step S4, from the basic target torque decided in the step S3, to thereby decide the final target torque.

Subsequently, in step S6, the engine control section 22 operates to control the engine 4 to cause the engine 4 to output the final target torque set in the step S5. Specifically, the engine control section 22 operates to, based on the final target torque set in the step S5 and an engine speed, decide various engine state amounts (e.g., air charge amount, fuel injection amount, intake-air temperature, and oxygen concentration) required for realizing the final target torque, and then, based on the decided state amounts, control a plurality of actuators for driving various components of the engine 4. In this case, the engine control section 22 operates to set a limit value or range with respect to each of the state amounts, and set a controlled variable of each actuator to enable its related state amount to preserve limitation by the limit value or range, so as to execute engine control.

After completion of the step S6, the PCM 14 operates to terminate the engine control processing routine.

Figure 7:
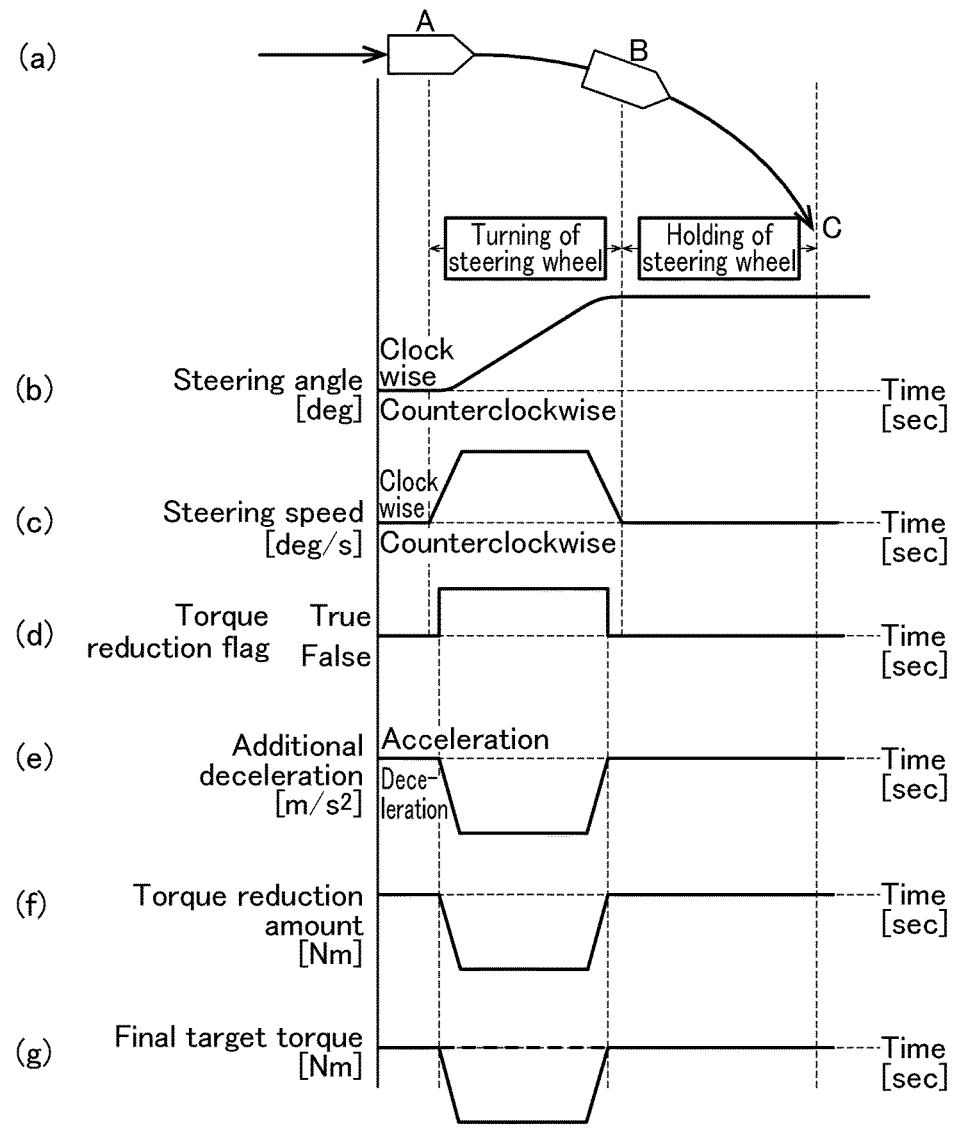
FIG. 7 is a time chart presenting a temporal change of each parameter pertaining to engine control occurring when a vehicle equipped with the vehicle behavior control device according to this embodiment is turning along with a steering wheel operation, wherein: chart(a) is a top plan view schematically depicting the vehicle which is turning in a clockwise direction; chart(b) is a chart presenting a change in steering angle of the vehicle which is turning in the clockwise direction; chart(c) is a chart presenting a change in steering speed of the vehicle which is turning in the clockwise direction; chart(d) is a chart presenting a value of a torque reduction flag set based on the steering speed; chart(e) is a chart presenting a change in additional deceleration decided based on the steering speed and the torque reduction flag; chart(f) is a chart presenting a change in torque reduction amount decided based on the additional deceleration; and chart(g) is a chart presenting a change in final target torque decided based on a basic target torque and the torque reduction amount.

Next, with reference to FIG. 7, one example of behavior control to be executed when the steering angle of the front road wheel 2 of the vehicle 1 equipped with the vehicle behavior control device according to this embodiment is changed by the operation of the steering wheel 6 will be described. FIG. 7 is a time chart presenting a temporal change in each parameter pertaining to engine control, occurring when the vehicle 1 equipped with the vehicle behavior control device according to this embodiment is turning according to the operation of the steering wheel 6.

In FIG. 7, chart(a) is a top plan view schematically depicting the vehicle which is turning in a clockwise direction. As depicted in chart(a), the vehicle starts to turn in the clockwise direction from a position A, and continues to turn from a position B to a position C in the clockwise direction at a constant steering angle.

Chart(b) is a chart presenting a change in steering angle of the vehicle 1 which is turning in the clockwise direction as depicted in chart(a). In chart(b), the horizontal axis represents time, and the vertical axis represents steering angle.

As presented in chart(b), clockwise steering is started at the position A, and then, along with an additional turning operation of the steering wheel 6, a clockwise steering angle gradually increases and reaches a maximum value at the position B. Subsequently, the steering angle is maintained constant until the vehicle 1 reaches the position C (Holding of the steering wheel).

Chart(c) is a chart presenting a change in steering speed of the vehicle 1 which is turning in the clockwise direction as depicted in chart(a). In chart(c), the horizontal axis represents time, and the vertical axis represents steering speed.

The steering speed in the vehicle 1 is expressed as a temporal differentiation of the steering angle in the vehicle 1. That is, as presented in chart(c), when clockwise steering is started at the position A, a clockwise steering speed arises and is maintained approximately constant in an intermediate zone between the position A and the position B. Then, when the clockwise steering speed deceases and the clockwise steering angle reaches the maximum value at the position B, the steering speed becomes 0. Then, when the clockwise steering angle is maintained during traveling from the position B to the position C, the steering speed is kept at 0.

Chart(d) is a chart presenting the true/false value of the torque reduction flag set based on the steering speed. In chart(d), the horizontal axis represents time, and the vertical axis represents true/false value of the torque reduction flag.

As presented in chart(d), before the clockwise steering is started from the position A, the torque reduction flag is set to False. Then, when the clockwise steering is started from the position A, and the steering speed becomes greater than the threshold $T_{S1}$, the torque reduction flag is changed from False to True. Then, when the steering speed decreases as the vehicle 1 comes closer to the position B, and becomes equal to or less than the threshold $T_{S1}$, the torque reduction flag is changed from True to False.

Chart(e) is a chart presenting a change in additional deceleration decided based on the steering speed and the torque reduction flag. In chart(e), the horizontal axis represents time, and the vertical axis represents additional deceleration.

As described with reference to FIG. 5, when, in the step S22, the steering speed is greater than the threshold $T_{S1}$ (i.e., when the torque reduction flag is in True), the torque reduction amount-deciding section 18 operates, in the step S24, to obtain the target additional deceleration based on the steering speed. Subsequently, in the step S25, the torque reduction amount-deciding section 18 operates to decide the additional deceleration in each processing cycle, under the condition that the change rate of the additional deceleration is equal to or less than the threshold $R_{max}$.

As presented in chart(e), the additional deceleration starts to increase when the torque reduction flag is switched from False to True, and is maintained approximately constant in the intermediate zone between the position A and the position B. Then, the additional deceleration starts to decrease along with decrease in the steering speed, and becomes 0 when the torque reduction flag is switched from True to False.

Chart(f) is a chart presenting a change in torque reduction amount decided based on the additional deceleration presented in chart(e). In chart(f), the horizontal axis represents time, and the vertical axis represents torque reduction amount.

As mentioned above, the torque reduction amount-deciding section 18 operates to decide a value of the torque reduction amount required for realizing the additional deceleration, based on parameters such as current vehicle speed, speed stage and road gradient. Thus, in the case where respective values of these parameters are constant, the torque reduction amount is decided such that it changes in the same pattern as that of the additional deceleration presented in chart(e).

Chart(g) is a chart presenting a change in final target torque decided based on the basic target torque and the torque reduction amount. In chart(g), the horizontal axis represents time, and the vertical axis represents torque. In chart(g), the dotted line indicates the basic target torque, and the solid line indicates the final target torque.

As described with reference to FIG. 4, the final target torque-deciding section 20 operates to subtract the torque reduction amount decided by the torque reduction amount-deciding processing subroutine in the step S4, from the basic target torque decided in the step S3, to thereby decide the final target torque.

That is, during the period where the torque reduction flag is set to True in the zone between the position A and the position B, the final target torque is reduced from the basic target torque by the torque reduction amount, as presented in chart(g), and a deceleration corresponding to this torque reduction arises in the vehicle 1, so that a load shift toward the front road wheels 2 occurs. As a result, a frictional force between each of the front road wheels 2 and a road surface is increased, and a cornering force of the front road wheels 2 is increased. This makes it possible to control a behavior of the vehicle 1 with good responsivity with respect to a steering wheel operation by a driver to accurately realize the vehicle behavior as intended by the driver.

Figure 8:
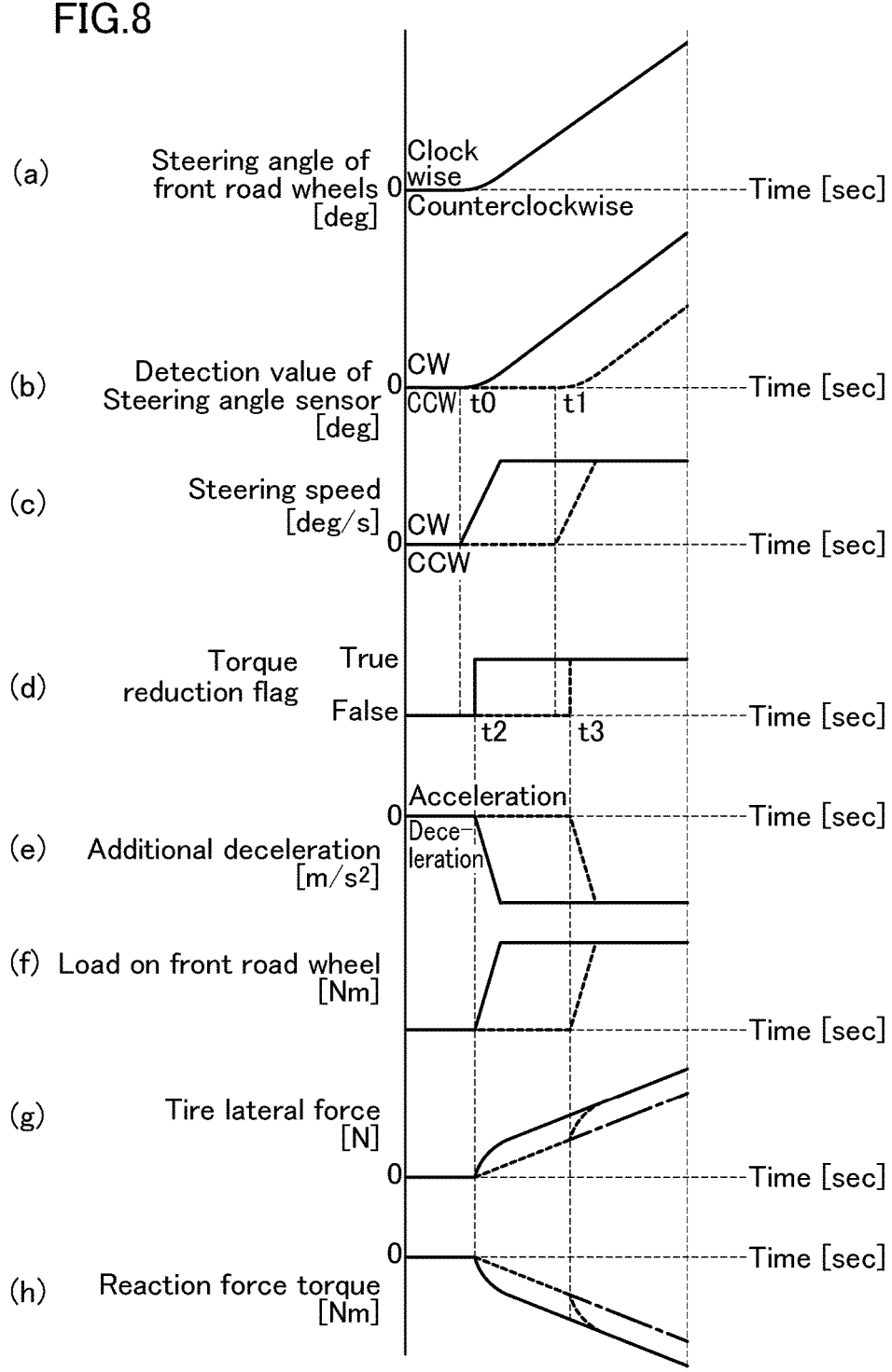
FIG. 8 is a time chart presenting a temporal change of each parameter pertaining to engine control and vehicle behavior, occurring when a steering angle of front road wheel of a vehicle equipped with the vehicle behavior control device according to this embodiment is changed by a disturbance force, wherein: chart(a) is a chart presenting a change in steering angle of the front road wheel; chart(b) is a chart presenting a change in steering angle detected by a steering angle sensor; chart(c) is a chart presenting a change in steering speed calculated from a detection value of the steering angle sensor; chart(d) is a chart presenting a value of a torque reduction flag set based on the steering speed in chart(c); chart(e) is a chart presenting a change in additional deceleration decided based on the steering speed and the torque reduction flag; chart(f) is a chart presenting a change in vertical load on front road wheel; chart(g) is a chart presenting a change in lateral force arising in the front road wheel; and chart(h) is a chart presenting a change in reaction force torque transmitting from a road surface to a steering shaft via the front road wheel.

Next, with reference to FIG. 8, a vehicle behavior occurring when the steering angle of the front road wheel 2 of the vehicle 1 equipped with the vehicle behavior control device according to this embodiment is changed by a disturbance force. FIG. 8 is a time chart depicting a temporal change of each parameter pertaining to engine control and vehicle behavior, occurring when the steering angle of the front road wheel 2 of the vehicle 1 equipped with the vehicle behavior control device according to this embodiment is changed by a disturbance force.

FIG. 8 shows one example where, when the vehicle 1 travels in a straight-ahead direction, at least one of the front road wheels 2 is forcibly steered in the clockwise direction by a disturbance force, e.g., influence of unevenness of a road surface or crosswind.

In FIG. 8, the solid lines indicate a behavior of the vehicle 1 equipped with the vehicle behavior control device according to this embodiment, wherein the steering angle sensor 36 is installed at a position on the side of the front road wheels 2 with respect to the torsion bar 24a, and the dotted lines indicate a behavior of the vehicle 1, wherein a steering angle sensor is installed at a position on the side of the steering wheel 2 with respect to the torsion bar 24a, as in conventional devices.

In FIG. 8, chart(a) is a chart presenting a change in steering angle of the front road wheel 2, and chart(b) is a chart presenting a change in steering angle detected by the steering angle sensor 36.

Suppose that a driver holds the steering wheel 6 as presented in chart(a), when the steering angle of the front road wheel 2 of the vehicle 1 is increased in the clockwise direction, e.g., when a disturbance force is applied to the front road wheel 2 in a direction causing an increase in clockwise steering angle of the front road wheel 2. In this case, according to a torque arising from the disturbance force and a torque arising from holding of the steering wheel 6 by the driver, a torsion occurs in the torsion bar 24a having low torsional rigidity, and therefore a difference in rotational angle occurs between respective portions of the steering shaft 24 on the side of the front road wheels and on the side of the steering wheel 6 across the torsion bar 24a.

That is, as indicated by the solid line in chart(b), a detection value of the steering angle sensor 36 installed on the side of the front road wheels 2 with respect to the torsion bar 24a starts to increase at time t0, almost without delay after start of the increase in steering angle of the front road wheel 2. On the other hand, in the case where a steering angle sensor is installed on the side of the steering wheel 6 with respect to the torsion bar 24a, a rotation of one end of the torsion bar 24 on the side of the steering wheel 6 is delayed with respect to the other end of the torsion bar 24 on the side of the front road wheels 2, so that a detection value of this steering angle starts to increase at time t1 with a delay after start of the increase in steering angle of the front road wheel 2, as indicated by the dotted line in chart(b).

Chart(c) is a chart presenting a change in steering speed calculated from a detection value of the steering angle sensor 36, and chart(d) is a chart presenting a value of the torque reduction flag set based on the steering speed in chart(c).

As presented in chart(c), a steering speed calculated from the detection value of the steering angle sensor 36 installed on the side of the front road wheels 2 with respect to the torsion bar 24a rapidly raises from the time t0, whereas, in the case where a steering angle sensor is installed on the side of the steering wheel 6 with respect to the torsion bar 24a, a detection value of this steering angle sensor is delayed after start of the increase in steering angle of the front road wheel 2, and therefore a steering speed calculated from this detection value also raises from the time t1 with the delay.

Thus, as presented in chart(d), regarding a timing when the torque reduction flag is changed from False to True, in the case where the steering speed is calculated using the detection value of the steering angle sensor 36 the steering angle sensor 36 installed on the side of the front road wheels 2 with respect to the torsion bar 24a, the change occurs at time t2 approximately just after start of the increase in steering angle of the front road wheel 2, whereas, in the case where a steering angle sensor is installed on the side of the steering wheel 6 with respect to the torsion bar 24a, the change occurs at time t3 with a delay after start of the increase in steering angle of the front road wheel 2.

Chart(e) is a chart presenting a change in additional deceleration decided based on the steering speed and the torque reduction flag.

As presented in chart(e), the additional deceleration starts to increase just after the torque reduction flag is switched from False to True, and changes according to the steering speed calculated from the detection value of the steering angle sensor 36, under conditions that the additional deceleration is equal to or less than the upper limit value $D_{max}$ thereof (e.g., 0.5 m/s$^2$≈0.05 G), and a change rate thereof is equal to or less than the threshold $R_{max}$ (e.g., 0.5 m/s$^3$).

That is, regarding a timing when reduction in output torque of the engine 4 starts, in the case where the steering speed is calculated using the detection value of the steering angle sensor 36 installed on the side of the front road wheels 2 with respect to the torsion bar 24a, the reduction starts at the time t2 approximately just after start of the increase in steering angle of the front road wheel 2, whereas, in the case where a steering angle sensor is installed on the side of the steering wheel 6 with respect to the torsion bar 24a, the reduction starts at the time t3 with a delay after art of the increase in steering angle of the front road wheel 2.

Chart(f) is a chart presenting a change in vertical load on the front road wheel 2.

When a deceleration arises in the vehicle 1 by reducing the output torque according to the steering speed calculated from the detection value of the steering angle sensor 36, a load shift occurs from a rear portion toward a front portion of the vehicle 1 according to the deceleration, and therefore a vertical load on the front road wheel 2 is increased.

That is, as presented in chart(f), regarding a timing when the vertical load on the front road wheel 2 starts to increase, in the case where the steering speed is calculated using the detection value of the steering angle sensor 36 installed on the side of the front road wheels 2 with respect to the torsion bar 24a, the increase starts at the time t2 approximately just after start of the increase in steering angle of the front road wheel 2, whereas, in the case where a steering angle sensor is installed on the side of the steering wheel 6 with respect to the torsion bar 24a, the increase starts at the time t3 with a delay after start of the increase in steering angle of the front road wheel 2.

Chart(g) is a chart presenting a change in lateral force arising in the front road wheel 2. In chart(g), the one-dot chain line indicates a change in lateral force occurring when the output torque reduction control is not performed.

In a linear region of a tire curve where a tire slip angle is relatively small, the lateral force is approximately proportional to the slip angle. Thus, when the output torque reduction control is not performed, the lateral force increases along with an increase in steering angle of the front road wheel 2, as indicated by the one-dot chain line in chart(g).

Further, when the vertical load on the front road wheel 2 is increased, a frictional force in a road contact area of each of the front road wheel 2 is increased, and therefore the lateral force arising in the road contact area of the front road wheel 2 is increased. That is, the lateral force arising in the front road wheel becomes larger as compared to the lateral force indicated by the one-dot chain line in chart(g), occurring when the output torque reduction control is not performed.

When the output torque reduction control is performed according to the steering speed calculated from the detection value of the steering angle sensor 36 installed on the side of the front road wheels 2 with respect to the torsion bar 24a, the vertical load on the front road wheel 2 starts increase from the time t2 approximately just after start of the increase in steering angle of the front road wheel 2, as mentioned above, and accordingly the lateral force arising in the front road wheel 2 also starts to increase approximately just after start of the increase in steering angle of the front road wheel 2.

On the other hand, in the case where a steering angle sensor is installed on the side of the steering wheel 6 with respect to the torsion bar 24a, the lateral force arising in the front road wheel 2 starts to increase at the time t3 with a delay after start of the increase in steering angle of the front road wheel 2.

Chart(h) is a chart presenting a change in reaction force torque transmitting from a road surface to the steering shaft 24 via the front road wheel 2 (a torque acting to return the steered front road wheel 2 to a steering angle enabling straight-ahead traveling). In chart(h), the one-dot chain line indicates a change in reaction force torque occurring when the output torque reduction control is not performed.

It is known that, in the linear region of the tire curve where the tire slip angle of the front road wheel 2 is relatively small, a magnitude of the torque acting to return the steered front road wheel 2 to a steering angle enabling straight-ahead traveling is proportional to the lateral force arising in the steered front road wheel 2. Thus, in the case where the output torque reduction control is not performed, when the lateral force increases along with an increase in steering angle of the steered front road wheel 2, the reaction force torque increases in proportion to the lateral force, as indicated by the one-dot chain line in chart(f). Further, when the lateral force increases along with an increase in vertical force on the front road wheel 2 by the output torque reduction control, the reaction force torque further increases.

In the case where a steering angle sensor is installed on the side of the steering wheel 6 with respect to the torsion bar 24a, the detection of a change in steering angle of the front road wheel 2 is delayed due to a torsion of the torsion bar 24a, as mentioned above, so that the vertical load on the front road wheel 2 increases by the output torque reduction control, and the lateral force further increases, from the time t3 with a delay after start of the increase in steering angle of the front road wheel 2, and accordingly the reaction force torque also increases from the time t3 with a delay after start of the increase in steering angle of the front road wheel 2, as indicated by the one-dot chain line in chart(h).

That is, when at least one of the front road wheels 2 is forcibly steered in the clockwise direction by a disturbance force, e.g., influence of unevenness of a road surface or crosswind, the steering angle sensor 36 operates to detect a change in steering angle of the front road wheel 2, and the PCM 14 operates to perform the output torque reduction control based on the steering speed according to the detected steering angle, to increase the reaction force torque acting on the front road wheel 2. In this situation, a lateral displacement has already occurred in a course of the vehicle, and therefore a driver is feeling a disturbance force via the steering wheel 6.

On the other hand, in the case where the output torque reduction control is performed according to a steering speed calculated from the detection value of the steering angle sensor 36 installed on the side of the front road wheels 2 with respect to the torsion bar 24a, the vertical load on the front road wheel 2 and the lateral force start to increase, at the time t2 approximately just after start of the increase in steering angle of the front road wheel 2, and accordingly the reaction force torque also starts to increase at the time t2 approximately just after start of the increase in steering angle of the front road wheel 2. That is, when at least one of the front road wheels 2 is forcibly steered in the clockwise direction by a disturbance force, e.g., influence of unevenness of a road surface or crosswind, the steering angle sensor 36 operates to immediately detect a change in steering angle of the front road wheel 2, and the PCM 14 operates to perform the output torque reduction control based on the steering speed according to the detected steering angle, to increase the reaction force torque acting on the front road wheel 2, so that a force for returning the steering angle of the front road wheel 2 to an angle enabling straight-ahead traveling acts on the front road wheel 2 before the disturbance force is transmitted to a driver via the steering wheel 6. This makes it possible to suppress a lateral displacement of a course of the vehicle 1 due to a disturbance force, to improve stability of straight-ahead traveling performance of the vehicle 1.

Further, in a situation where the driver who feels the steering movement of the front road wheel 2 caused by the disturbance force, via the steering wheel 6, attempts to perform corrective steering operation for maintaining the course of the vehicle 1, the PCM operates to perform the output torque reduction control before start of the corrective steering operation, to increase the vertical load on the front road wheel 2, so that it is possible to further increase the lateral force when the driver actually starts the corrective steering operation, and enhance responsivity of behavior of the vehicle 1 with respect to the corrective steering operation. This makes it possible to suppress an unnecessary corrective steering operation to improve stability of the vehicle attitude and riding comfort.

Figure 9:
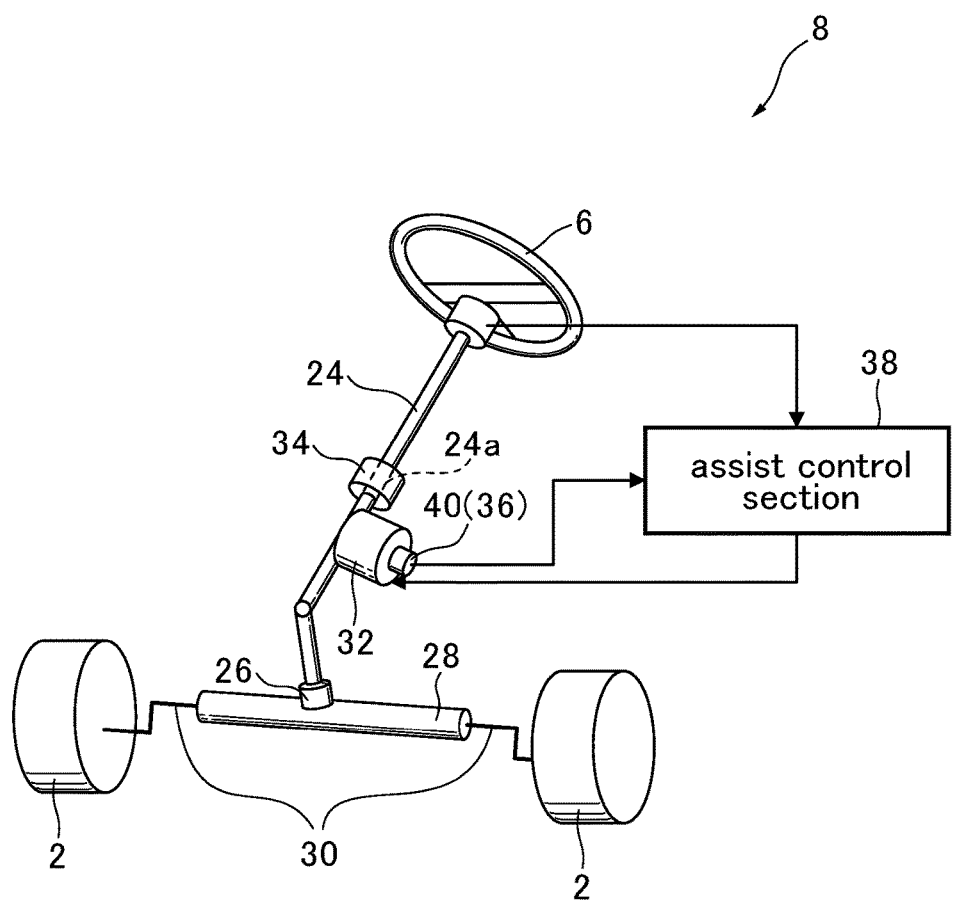
FIG. 9 is a schematic perspective view depicting a steering apparatus in one modification of the above embodiment.
Figure 10:
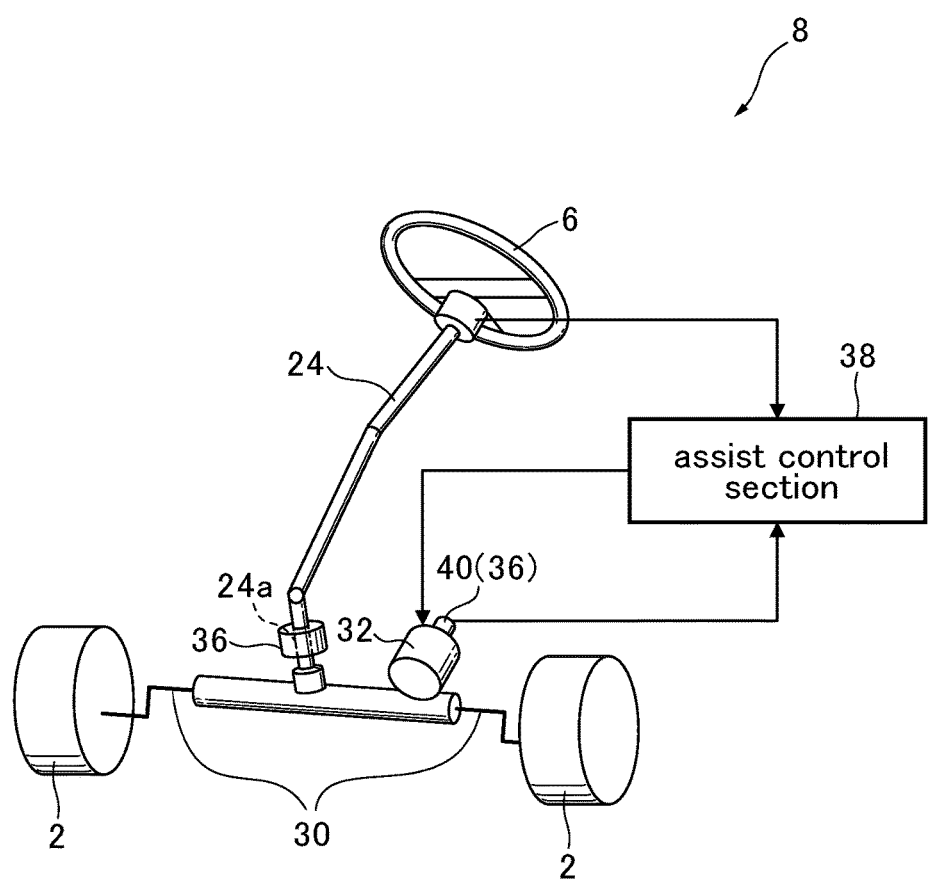
FIG. 10 is a schematic perspective view depicting a steering apparatus in another modification of the above embodiment.

Next, a modification of the above embodiment will be described. FIGS. 9 and 10 are schematic perspective views depicting two types of steering apparatuses 8 in modifications of the above embodiment.

The above embodiment has been described based on an example where the steering angle sensor 36 for detecting a rotational angle of the steering shaft 24 as the steering angle is installed on the side of the front road wheels 2 with respect to the torsion bar 24a. Alternatively, as depicted in FIG. 9, a motor angle sensor 40 for detecting a rotational angle of the motor 32 may be used as a steering angle sensor 36.

Further, although the steering apparatus 8 in the above embodiment is constructed as a column assist type EPAS apparatus in which the motor 32 is disposed on the steering shaft 24, the steering apparatus 9 usable in the present invention may be any other type of EPAS apparatus.

For example, as depicted in FIG. 10, the steering apparatus 8 may be a dual pinion type EPAS apparatus in which the motor 32 is disposed on the rack shaft 28. In this case, a motor angle sensor 40 for detecting a rotational angle of the motor 32 disposed on the rack shaft 28 on the side of the front road wheels 2 with respect to the torsion bar 24a may be used as a steering angle sensor 36 to bring out the same functions/effects as those in the above embodiment.

The above embodiment has been described based on an example where the vehicle 1 equipped with the vehicle behavior control device has the engine 4 for driving drive road wheels. However, the vehicle behavior control device of the present invention may also be applied to a vehicle having a motor for driving the drive road wheels by electric power supplied from a battery or a capacitor. In this case, the PCM 14 may be configured to perform control to reduce a torque of the motor according to the steering speed of the vehicle 1.

Next, an advantageous effect of the vehicle behavior control device according to each of the above embodiment of the present invention and the modifications of the embodiment will be described.

The PCM 14 is configured to acquire a steering speed based on a steering angle detected by the steering angle sensor 36 installed at a position on the side of the front road wheels 2 with respect to the torsion bar 24a whose torsional rigidity about the rotational axis of the steering shaft 24 is less than the remaining portion of the steering shaft 24, and reduce the driving force for the vehicle 1 according to the acquired steering speed, so that, in a situation where at least one of the front road wheels 2 is forcibly steered by a disturbance force, e.g., influence of unevenness of a road surface or crosswind, the steering angle sensor 36 can immediately detect a change in steering angle of the front road wheel 2, and the PCM 14 can perform the output torque reduction control based on the steering speed according to the detected steering angle. This makes it possible to generate the reaction force torque acting to return the steering angle of the front road wheel 2 to an angle enabling straight-ahead traveling, before the disturbance force is transmitted to a driver via the steering wheel 6, to thereby improve straight-ahead traveling performance of the vehicle 1.

Further, in a situation where a driver who feels, via the steering wheel 6, a steering movement of the front road wheel 2 caused by the disturbance force attempts to perform the corrective steering operation so as to hold a current course of the vehicle 1, the PCM is operable, before the driver starts the corrective steering operation, to perform the driving force reduction control to increase the vertical load on the front road wheel 2, so that it is possible to increase a lateral force generated when the driver actually starts the corrective steering operation, and thus enhance responsivity of behavior of the vehicle 1 with respect to the corrective steering operation. This makes it possible to suppress an unnecessary corrective steering operation to improve stability of the vehicle attitude and riding comfort.

In particular, the steering apparatus 8 comprises the torque sensor 34 for detecting a steering torque based on an amount of torsion of the torsion bar 24a, and an electric motor for applying an assist torque to the steering apparatus according to the steering torque detected by the torque sensor, at the position on the side of the front road wheels 2 with respect to the torsion bar 24a. That is, in the case where the steering apparatus 8 is constructed as an EPAS apparatus comprising the torque sensor 34 and the motor 32, the steering speed sensor 36 operates to acquire the steering speed based on the steering speed detected by the steering angle sensor 36 installed at a position on the side of the front road wheels 2 with respect to the torsion bar 24a in which the torque sensor 34 is installed, and reduce the driving force for the vehicle 1 according to the acquired steering speed, so that, in a situation where at least one of the front road wheels 2 in the vehicle 1 equipped with the steering apparatuses 8 composed of an EPAS apparatus is forcibly steered by a disturbance force, e.g., influence of unevenness of a road surface or crosswind, the steering angle sensor 36 can immediately detect a change in steering angle of the front road wheel 2, and the PCM 14 can perform the output torque reduction control based on the steering speed according to the detected steering angle. This makes it possible to quickly generate the reaction force torque acting to return the steering angle of the front road wheel 2 to an angle enabling straight-ahead traveling, and suppress an unnecessary corrective steering operation to improve stability of the vehicle attitude and riding comfort.

In the above embodiment or modified embodiment, the PCM 14 is configured to acquire the steering speed based on a rotational angle of the motor 32 disposed on the side of the front road wheels 2 with respect to the torsion bar 24a, so that it is possible to use the motor angle sensor 40 as the steering angle sensor 36 to achieve reduction in component cost and simplification in production process, as compared to case where a e steering angle sensor 36 is provided separately.

In the above embodiment or modified embodiment, the PCM 14 is operable to reduce the driving force for the vehicle 1, according to the steering speed, such that a deceleration of the vehicle 1 caused by the reduction in the driving force according to the steering speed becomes 0.05 G or less, so that, in the situation where at least one of the front road wheels 2 is forcibly steered by a disturbance force, e.g., influence of unevenness of a road surface or crosswind, it is possible to perform the output reduction control based on the steering speed according to a change in steering angle of the front road wheel 2 detected by the steering angle sensor 36. This makes it possible to improve stability of the vehicle attitude and riding comfort without causing strong feeling of intervention of the control.

What is claimed is:

1. A vehicle behavior control device for controlling a behavior of a vehicle having steerable front road wheels, comprising:
   a steering apparatus configured to transmit a rotation of a steering wheel to the front road wheels, the steering apparatus having a steering shaft which is coupled to the steering wheel and rotatable together with the steering wheel;
   a steering speed acquisition section operable to acquire a steering speed in the steering apparatus; and
   a driving force reduction section operable, when the steering speed becomes equal to or greater than a given threshold which is greater than 0, to reduce a driving force for the vehicle according to the steering speed, wherein the steering shaft having a low rigidity portion whose torsional rigidity about a rotational axis of the steering shaft is less than a remaining portion of the steering shaft, wherein the steering speed acquisition section is configured to acquire the steering speed on the side of the front road wheels with respect to the low rigidity portion in the steering apparatus to acquire the steering speed by a forcible change in steering angle by a disturbance force on the side of the front road wheels with respect to the low rigidity portion, and wherein the driving force reduction section is operable to reduce the vehicle driving force according to the steering speed acquired on the side of the front road wheels with respect to the low rigidity portion before the forcible change in steering angle by the disturbance force is transmitted to a driver via the steering wheel.

2. The vehicle behavior control device as recited in claim 1, wherein the steering apparatus further comprises: a torque sensor for detecting a steering torque acting on the steering shaft according to operation of the steering wheel; and an electric motor for applying an assist torque to the steering apparatus according to the steering torque detected by the torque sensor, at the position on the side of the front road wheels with respect to the low rigidity portion, the torque sensor being configured to detect the steering torque based on an amount of torsion of the low rigidity portion.

3. The vehicle behavior control device as recited in claim 1, wherein the steering apparatus further comprises: a torque sensor for detecting a steering torque acting on the steering shaft according to operation of the steering wheel; and an electric motor for applying an assist torque to the steering apparatus according to the steering torque detected by the torque sensor, at the position on the side of the front road wheels with respect to the low rigidity portion, wherein the steering speed acquisition section is configured to acquire the steering speed based on a rotational angle of the motor.

4. The vehicle behavior control device as recited in claim 1, wherein the driving force reduction section is operable to reduce the vehicle driving force according to the steering speed, such that a deceleration of the vehicle caused by the reduction in the vehicle driving force becomes 0.05 G or less.

5. A vehicle behavior control device for controlling a behavior of a vehicle having steerable front road wheels, comprising:

an engine or an electric motor configured to generate a driving force for the vehicle so as to drive road wheels;

a steering apparatus configured to transmit a rotation of a steering wheel to the front road wheels, the steering apparatus having a steering shaft which is coupled to the steering wheel and rotatable together with the steering wheel;

a steering angle sensor operable to detect a steering angle in the steering apparatus;

a steering speed acquisition section operable to acquire a steering speed in the steering apparatus, based on the steering angle detected by the steering angle sensor; and a driving force reduction section operable, when the steering speed becomes equal to or greater than a given threshold which is greater than 0, to reduce the driving force of the engine or the electric motor according to the steering speed, wherein the steering shaft having a low rigidity portion whose torsional rigidity about a rotational axis of the steering shaft is less than a remaining portion of the steering shaft, wherein the steering angle sensor is configured to detect the steering angle on the side of the front road wheels with respect to the low rigidity portion in the steering apparatus, and the steering speed acquisition section is configured, based on the steering angle on the side of the front road wheels with respect to the low rigidity portion, to acquire the steering speed by a forcible change in steering angle by a disturbance force on the front road wheels, and wherein the driving force reduction section is operable to reduce the driving force of the engine or the electric motor according to the steering speed acquired on the side of the front road wheels with respect to the low rigidity portion before the forcible change in steering angle by the disturbance force is transmitted to a driver via the steering wheel.

* * * * *